S. GILLAM.
Harvester Cutter.
No. 55,084. Patented May 29, 1866.
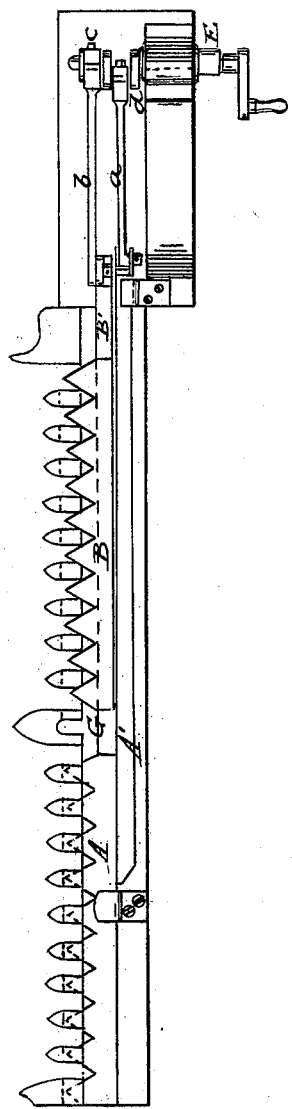

UNITED STATES PATENT OFFICE.

SEWELL GILLAM, OF NEW YORK, N. Y.

IMPROVEMENT IN HARVESTER-CUTTERS.

Specification forming part of Letters Patent No. 55,084, dated May 29, 1866.

*To all whom it may concern:*

Be it known that I, SEWELL GILLAM, of the city, county, and State of New York, have invented a new and useful Improvement in Reapers; and I do hereby declare that the following is a full, clear, and exact description thereof, which will enable others skilled in the art to make and use the same, reference being had to the accompanying drawing, forming part of this specification.

The accompanying drawing shows a top view of my improvement in reaping machines.

This invention relates to an improved mode of constructing and operating the sickle or cutter in reaping-machines, whereby the sickle-driving appliances are relieved of much strain, work more smoothly, and with less wear and tear to the machine.

My improvement consists in dividing an ordinary sickle or cutter into two sections—one section working outside of the other, and each having a cutting-front distinct and separate from the other, so that the weight of the sickle is divided—and then driving the different cutters or sections by different cranks placed at right angles to each other, so that the cutting labor is also divided, one crank being at its dead-point when the other is at the center of its stroke, the labor on the driving-shaft and other machinery being thereby balanced, which, for economy and durability, is important and desirable in all machinery having a high and rapid motion.

Having described the nature of my invention, I will proceed to describe its constuction and operation.

A A' and B B' in the accompanying drawing are the two cutters or sickles, and b a are their connecting-rods or pitmens, which connect with the crank-shaft E by means of the cranks c d, which are placed at quadrantal distance from each other. G is the finger-bar.

In the position of the knives as shown the sickle A and crank d are at their dead-point, and the sickle B, with its crank c, are at the center of stroke, and the sickle B is passing through the most rapid portion of its stroke; and thus the movement of the knives alternates, so that the jar of the vibrating parts and the labor resistance is divided up and distributed more evenly on the moving appliances—that is, the crank-shaft E is balanced, and consequently does its work more smoothly and economically, and with less shocks and strains, giving greater durability to the machinery.

Having thus described my invention, what I claim as new, and desire to secure by Letters Patent, is—

I do not claim the use of two sickles working on the same finger-bar, when the said sickles have a cutting-front, which is common to both, as this arrangement of sickles or cutters has been known and used heretofore; but What I do claim is—

The arrangement of the pitman a and crank d, pitman b and crank c, in combination with the sickles A and B, operating in the manner and for the purpose herein specified.

The above specifiation of my invention signed by me this 26th day of January, 1866.

SEWELL GILLAM.

Witnesses:
M. M. LIVINGSTON,
ALEX. F. ROBERTS.